Patented Jan. 27, 1948

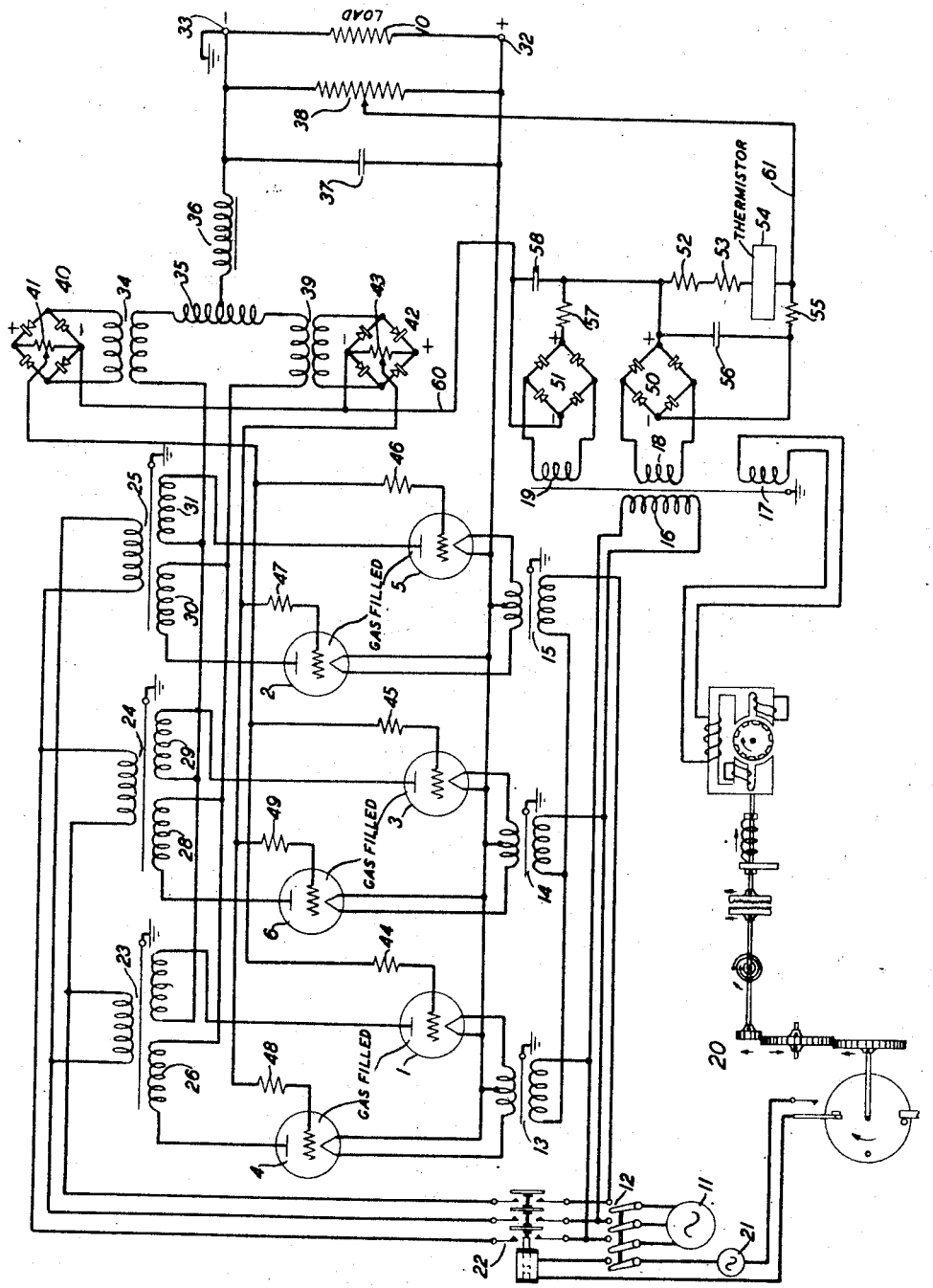

2,434,947

UNITED STATES PATENT OFFICE 2,434,947

REGULATED RECTIFIER

George W. Meszaros, New York, N. Y., and David E. Trucksess, Summit, N. J., assignors to Bell Telephone Laboratories, Incorporated, New York, N. Y., a corporation of New York Application September 16, 1943, Serial No. 502,596

14 Claims. (Cl. 175—363)

This invention relates to current supply apparatus and particularly to rectifying apparatus having a plurality of rectifying paths connected in parallel for supplying currents to a load circuit.

An object of the invention is to provide an improved regulated rectifier for supplying direct current to a load.

A further object of the invention is to provide rectifying apparatus having means for controlling the relative amplitudes of currents supplied through a plurality of current rectifying paths to a load.

Where it is desired to employ two or more similar paths in parallel, each path including a rectifying device, for supplying to a load unidirectional current having a greater amplitude than the safe maximum continuous output from a single rectifying path, the problem arises of maintaining the relative amplitudes of the currents in the several paths substantially equal. For example, in such an arrangement employing grid-controlled, gaseous electronic tube rectifying devices, the control of the currents in the several paths may be effected by providing in each path a resistor across which is produced a voltage drop proportional to the current flowing in the path and utilizing the voltages thus produced as grid biasing potentials for the rectifying devices to control the relative amplitudes of the currents in the several paths. Such an arrangement has the disadvantage that considerable power is dissipated in the resistors, the amount of power which is thus lost varying with load current. In accordance with the present invention this objection is obviated by utilizing the alternating or ripple components of the currents in two or more parallel rectifying paths for causing to be set up unidirectional biasing potentials for the control grids of the rectifying devices in the paths, the biasing potential produced due to the ripple component in a certain path preferably being applied to the control grid of the rectifying device, or the control grids of the rectifying devices, associated with that path. In some cases, however, it may be desired to utilize the potential produced due to the ripple component of the current in one path for biasing the control grid of a rectifier tube in a different path, the biasing potential being poled so as to equalize the currents in the paths, respectively.

In accordance with a specific embodiment of the invention herein shown and descibed for the purpose of illustration, there is provided a three-phase parallel double-Y rectifier to which energy is supplied from a three-phase current source for supplying direct current to a load. The rectifying system thus comprises two three-phase rectifiers operating in parallel with the phase voltages of one rectifier time displaced with respect to the phase voltages of the other rectifier. There are employed six grid-controlled arc discharge rectifier tubes each having an anode, a cathode and a control electrode. Anode voltages are impressed upon the rectifier tubes from three transformers having delta-connected primary windings to which current is supplied from the three-phase current source. Each transformer has two secondary windings for supplying to two of the rectifier tubes, respectively, voltages which are 180 degrees out of phase. The one three-phase rectifier comprises three of the rectifier tubes to which three-phase voltages are supplied from three star-connected secondary windings, one of each of the three transformers. The other three-phase rectifier comprises the remaining three rectifier tubes to which three-phase voltages are supplied from the remaining three star-connected secondary windings. The one three-phase rectifier supplies current to the load through a circuit traced from the cathodes of the rectifier tubes through the load, through a filter choke coil, through one half winding of an interphase autotransformer or reactor and through the primary winding of an auxiliary transformer to the common terminal of the star-connected secondary transformer windings. The other three-phase rectifier supplies current to the load through a circuit traced from the cathodes of the rectifier tubes through the load, through the filter choke coil, through the other half winding of the interphase transformer and through the primary winding of a second auxiliary transformer to the common terminal of the second group of star-connected secondary windings.

The alternating or ripple component of the current flowing through the primary winding of the first auxiliary transformer causes to be set up a corresponding alternating voltage at the terminals of its secondary winding which are connected to an auxiliary rectifier for causing a corresponding unidirectional current to flow through a resistor connected to the direct current terminals of the auxiliary rectifier. The voltage drop thus produced across the resistor or a portion thereof is applied to the grid-cathode circuits of the tubes of the first three-phase rectifier for biasing the grids with respect to the cathodes. Similar means are employed for biasing the grids of the tubes of the second three-phase rectifier with respect to their cathodes. The average unidirectional current supplied by each three-phase rectifier depends upon the length of the conducting period of each tube of the three-phase rectifier during each positive half cycle of its anode-cathode voltage. It has been found that the alternating or ripple component of the current supplied by each three-phase rectifier decreases as the length of the conducting periods, and therefore the average current, increases, and vice versa. Therefore when the average current supplied by one of the three-phase rectifiers increases due to the rectifier tubes firing earlier in each cycle while the average current supplied by the second three-phase rectifier remains fixed, for example, the ripple component of the current supplied by the first rectifier decreases to cause the bias voltage impressed upon the grids of the tubes of the first rectifier to become relatively less positive or more negative. Each of the tubes of the first rectifier thus becomes conducting later in each cycle of its anode-cathode voltage to cause the average current supplied by the first rectifier to decrease, thus tending to equalize the currents supplied by the two rectifiers.

Means are also provided for maintaining the load voltage substantially constant. A portion of the load voltage is applied to the control grids of the rectifier tubes of each of the three-phase rectifiers in a direction to make the grids more negative with respect to the cathodes in response to an increase in load voltage, and vice versa. The grids of the rectifier tubes are also biased from an auxiliary rectifier which is energized by current from one of the phases of the three-phase supply source for the purpose of substantially preventing current changes through the load due to changes of supply voltage.

The invention will now be described with reference to the single figure of the drawing which is a schematic view of a regulated rectifier embodying the invention. There are provided two three-phase rectifiers, one comprising grid-controlled, gas-filled triodes 1, 3 and 5, commonly known as "Thyratrons," and the other comprising similar tubes designated by the numerals 2, 4 and 6, for supplying direct current to a load 10 when energized from a 440-volt three-phase alternating current supply source 11. Each of the similar rectifier tubes 1 to 6, inclusive, comprises an anode, a cathode and a control electrode. When switch 12 is closed, current from three-phase source 11 is supplied to the star-connected primary windings of transformers 13, 14 and 15. One-half of the secondary winding of transformer 13 is connected to the thermionic cathode of tube 4 for supplying heating current thereto and the other half of the secondary winding is connected to the cathode of tube 1. The cathodes of electric discharge devices 6 and 3, respectively, are similarly connected to the secondary winding of transformer 14 and the cathodes of the devices 2 and 5, respectively, are similarly connected to the secondary winding of transformer 15. The mid-terminals of the secondary windings of transformers 13, 14 and 15 are connected to the positive load terminal 32. The closure of switch 12 also causes one of the phase voltages of the source 11 to be impressed upon the primary winding 16 of a transformer having three secondary windings 17, 18 and 19. A motor driven switch 20, which may be of the type disclosed in a copending application of J. A. Potter and D. E. Trucksess, Serial No. 466,860, filed November 25, 1942, (U. S. 2,377,370, granted June 5, 1945), is energized from the secondary transformer winding 17 for the purpose of completing a circuit for supplying current from an alternating current source 21 to the winding of electromagnetic switch 22. Thus, after a brief interval required for the cathodes of tubes 1 to 6, inclusive, to reach their operating temperature, the three-phase alternating current supply source is connected through switch 22 to the delta-connected primary windings of transformers 23, 24 and 25. Transformer 23 has two secondary windings 26 and 27 connected in the anode-cathode circuits of tubes 4 and 1, respectively, for impressing upon the anodes with respect to the cathodes of the tubes, respectively, voltages which are 180 degrees out of phase. The secondary windings 28 and 29 of transformer 24 are similarly connected to the anode-cathode circuits of tubes 6 and 3, respectively, and the secondary windings 30 and 31 of transformer 25 are similarly connected to the anode-cathode circuits of tubes 2 and 5, respectively. Secondary windings 27, 29 and 31 are star-connected, the common terminal being connected through the primary winding of an auxiliary transformer 34, through one half of the winding of interphase autotransformer 35 and through a filter choke coil 36 to the grounded negative load voltage terminal 33. A filter condenser 37 and a potentiometer 38 are each connected in shunt with respect to the load. Secondary windings 26, 28 and 30 are likewise star-connected, the common terminal of these windings being connected through the primary winding of an auxiliary transformer 39 through the second half of the winding of interphase autotransformer 35 and through filter choke coil 36 to the negative load voltage terminal 33.

There are thus provided two three-phase rectifiers connected in parallel for supplying direct current to load 10. The unidirectional current path for one of the three-phase rectifiers may be traced from the cathodes of tubes 1, 3 and 5 through the load 10, filter choke 36, autotransformer 35, the primary winding of transformer 34, and through star-connected windings 27, 29 and 31 to the anodes of tubes 1, 3 and 5. The unidirectional current path for the other three-phase rectifier may be traced from the cathodes of tubes 2, 4 and 6 through the load 10, choke coil 36, autotransformer 35, primary winding of transformer 39, and through the star-connected secondary windings 26, 28 and 30 to the anodes of tubes 4, 6 and 2. The filter 36, 37 and the load 10 are, of course, common to the two current paths. The unidirectional currents flowing in the two paths, respectively, have alternating or ripple components which flow through the primary windings of auxiliary transformers 34 and 39, respectively, and the filter 36, 37, the filter being provided for the purpose of preventing the flow of the alternating components through the load 10. There is set up across the secondary winding of transformer 34 an alternating voltage the amplitude of which varies in accordance with the amplitude of the alternating component of the current flowing through the primary transformer winding. The secondary winding of transformer 34 is connected to the alternating current terminals of a bridge rectifier 40 having a resistor 41 connected to its direct current terminals. The direct voltage drop produced across the resistor 41 or a portion thereof therefore varies in accordance with the amplitude of the alternating or ripple component of the current flowing through the primary winding of transformer 34. A similar circuit comprising a bridge rectifier 42 and a resistor 43 is connected to the secondary winding of transformer 39 for producing across the resistor 43 or a portion thereof a direct voltage drop which varies in accordance with the amplitude of the alternating component of the output current of the three-phase rectifier comprising tubes 4, 6 and 2 flowing through the primary winding of transformer 39.

As is well known, a grid-controlled gas-filled tube will become conducting during each positive half cycle of the voltage impressed upon the anode with respect to the cathode at an instant when the anode-cathode voltage is sufficiently high and the grid-cathode voltage has a certain value. As the grid is made relatively more positive or less negative with respect to the cathode, the tube will fire earlier in its positive anode-cathode half cycle, and vice versa. Where two rectifiers employing such rectifying tubes are connected in parallel for supplying rectified current to a load circuit, it has been found that, due to slight differences in thyratron critical grid starting characteristics, the division of the load current between the two rectifiers may be unequal when no means is provided for preventing this result, the tube or tubes of one rectifier commencing to conduct or fire earlier in each positive half cycle of the anode-cathode voltage or voltages than the tube or tubes of the other rectifier. It has also been found that as the average current supplied to the load circuit from one of the three-phase rectifiers, say the rectifier comprising tubes 1, 3 and 5, decreases due to the tubes commencing to fire later during each positive half cycle of anode-cathode voltage, for example, the alternating component of the rectifier current flowing through the primary winding of transformer 34 increases to cause the direct voltage across the resistor 41 to increase correspondingly. The voltage drop across a portion of resistor 41 is impressed upon the grid-cathode circuits of tubes 1, 3 and 5 to cause these tubes to become conducting earlier in each cycle and thus to increase the average current supplied to the load circuit by this rectifier. If the average current supplied by this rectifier increases the bias voltage across resistor 41 is decreased to cause tubes 1, 3 and 5 to fire later in each cycle to decrease the average current supplied to the load circuit by this rectifier. Similarly, the voltage drop across resistor 43 is utilized for biasing the grids of tubes 2, 4 and 6 for controlling the firing times of these tubes and the average current supplied to the load by the rectifier comprising tubes 2, 4 and 6. The grids of tubes 1, 3 and 5 are connected through resistors 44, 45 and 46, respectively, to an adjustable connection to resistor 41 while the grids of tubes 2, 4 and 6 are connected through resistors 47, 48 and 49 to an adjustable connection to resistor 43. The resistors 44 to 49, inclusive, limit the grid current of each tube to a safe value.

There are also provided means for controlling the biasing potential applied to the grids of tubes 1 to 6, inclusive, to maintain the load voltage substantially constant irrespective of load variations and supply voltage variations. As is well known, if such a means were not provided the load voltage would tend to increase in response to a rise in supply voltage and in response to a decrease in load, and vice versa. The secondary transformer winding 18 is connected to a bridge rectifier 50 and the secondary transformer winding 19 is connected to a bridge rectifier 51. The direct current terminals of rectifier 50 are connected to a circuit comprising in series a resistor 52 having a negative temperature coefficient, a resistor 53 having a positive temperature coefficient, a thermistor 54 and a resistor 55, the resistance of which is constant over an operating range of temperatures or which may have a positive temperature coefficient. A condenser 56 is connected across the rectifier 50 to suppress alternating current components. The voltage across the portion of the circuit consisting of resistors 52 and 53 and thermistor 54 in series is substantially constant as described in a copending application of J. A. Potter, Serial No. 457,258, filed September 4, 1942 (U. S. 2,356,269, granted August 22, 1944). The positive output terminal of rectifier 50 is connected through a resistor 57 to the positive output terminal of rectifier 51 and the negative terminal of rectifier 51 is connected by way of lead 60 to the negative terminal of rectifier 40 and to the negative terminal of rectifier 42. A condenser 58 is connected across the portion of the circuit consisting of rectifier 51 and resistor 57 for suppressing alternating current components. The common terminal of resistor 55 and thermistor 54 is connected by way of lead 61 to the variable tap of potentiometer 38. The grid cathode circuits of tubes 1 to 6, inclusive, may therefore be traced from the tube cathodes through a portion of the resistance of potentiometer 38, lead 61, thermistor 54, resistor 53, resistor 52, resistor 57, rectifier 51, lead 60 to the negative terminals of rectifiers 40 and 42, from a tap of resistor 41 through the respective grid resistors to the grids of tubes 1, 3 and 5, respectively, and from a tap of resistor 43 through the respective grid resistors to the grids of tubes 2, 4, and 6, respectively.

Assuming that the load is fixed, when the supply voltage increases, the grids of tubes 1 to 6 are made relatively more negative with respect to the cathodes due to the increased voltage across the direct current terminals of rectifier 51, and vice versa, thus substantially preventing changes in load current due to changes in anode voltage applied to tubes 1 to 6 and maintaining the load voltage substantially constant irrespective of line voltage changes. Assuming now that the line voltage is fixed, when the load voltage increases slightly, due to a decrease in load, for example, the grids of tubes 1 to 6, inclusive, are made relatively more negative with respect to the cathodes to cause the load current to decrease, and vice versa, thus maintaining the load voltage substantially constant irrespective of load changes.

Further considering the operation of the current supply apparatus, assume first that the supply voltage, the load and the load voltage are fixed and that tubes 1, 3 and 5 commence firing earlier in the positive half cycles of the anode-cathode voltages and tubes 2, 4 and 6 commence firing later in the positive half cycles of the anode-cathode voltages with the result that the current supplied to the load by the rectifier comprising tubes 1, 3 and 5 increases while the current supplied to the load by the rectifier comprising tubes 2, 4 and 6 decreases by an equal amount so that the current through load 10 remains fixed. The voltage across resistor 41 decreases to make the grids of tubes 1, 3 and 5 relatively less positive or more negative to cause these tubes to fire later and the voltage across resistor 43 increases to make the grids of tubes 2, 4 and 6 relatively more positive or less negative to cause these tubes to fire earlier. The current supplied to the load by rectifier 1, 3, 5 is thus decreased and that supplied by rectifier 2, 4, 6 is increased to make the two currents equal.

Assume next that the supply voltage and the load resistor 10 are fixed, that tubes 1 to 6, inclusive, commence firing earlier in the positive half cycles of their anode-cathode voltages and that tubes 1, 3 and 5 fire earlier than do tubes 2, 4 and 6 so that the current supplied to the load by rectifier 1, 3, 5 is greater than that supplied by rectifier 2, 4, 6. The current supplied to the load is increased to cause an increase in load voltage. The voltages across resistors 41 and 43, respectively, decrease and the voltage across the portion of potentiometer 38 in the grid-cathode circuit of tubes 1 to 6, inclusive, increases. The grids of tubes 1 to 6, inclusive, are thus made relatively more negative or less positive to cause the tubes to fire later to reduce the current supplied to the load 10 and thus reduce the load voltage to its normal value. The grid-cathode voltages of tubes 1, 3 and 5 is changed by a greater amount than is the grid-cathode voltage of tubes 2, 4 and 6 due to the voltage change across resistor 41 being greater than the voltage change across resistor 43, thus causing the currents supplied by rectifiers 1, 3, 5 and 2, 4, 6 to become equal.

Finally, assume that the supply voltage is fixed and that the load is decreased, that is, that the load resistor 10 is increased. The load voltage will rise and the voltages across resistors 41 and 43 will rise because of the decreased currents supplied to the load from the two rectifiers. The increase in voltage across the portion of potentiometer 38 which is in the grid-cathode circuits of tubes 1 to 6, inclusive, is greater than the voltage increase across the portion of resistor 41 which is in the grid-cathode circuits of tubes 1, 3 and 5 and greater than the voltage increase across the portion of resistor 43 which is in the grid-cathode circuits of tubes 2, 4 and 6. Therefore the grids of tubes 1 to 6, inclusive, become relatively more negative or less positive to cause the tubes to fire later and thus reduce the currents supplied to the load. The load voltage is thus decreased to its original value.

In some cases it may be desirable to modify the rectifying system shown in the drawing so that the voltage set up due to the alternating component of the current supplied by one of a plurality of rectifiers is used to bias the grids of the rectifying tubes of a different rectifier. For example, the positive terminals of rectifiers 40 and 42 may be connected to the lead 60, the resistor 41 connected to the grids of tubes 2, 4 and 6 and the resistor 43 connected to the grids of tubes 1, 3 and 5. Moreover, the invention is obviously not limited to a rectifier system employing two three-phase rectifiers in parallel for supplying current to a load but may be used in other rectifier systems employing at least two rectifying paths in parallel for supplying current to a load.

What is claimed is:

1. In combination, two electronic devices each having an anode, a cathode and a control electrode, current paths for the anode-cathode currents flowing in said devices, respectively, a source of alternating voltage in each of said paths for causing to flow in said paths, respectively, currents having direct and alternating components, two means for rectifying alternating currents supplied thereto, means for supplying said alternating current components from said paths to said rectifying means, respectively, for causing to be set up unidirectional voltages the amplitudes of which vary in response to alternating component current variations in the respective paths, and means for maintaining substantially constant the ratio of the currents in said paths, said means comprising means for utilizing one of said unidirectional voltages for biasing the control electrode of one of said devices with respect to its cathode, and means for utilizing the other of said unidirectional voltages for biasing the control electrode of the other of said devices with respect to its cathode.

2. In combination with a plurality of parallel connected current paths each comprising space discharge rectifying means to which is supplied current from an alternating current supply source for causing rectified currents each having direct and alternating components to flow in said paths, respectively, a plurality of circuits each comprising auxiliary rectifying means and resistance means for causing direct voltages to be set up across said resistance means in response to alternating currents supplied to said circuits, respectively, means for supplying said alternating components of the currents in said paths to said circuits, respectively, said means comprising transformers for coupling said paths to said circuits, respectively and means for utilizing the direct voltages set up across said resistance means for biasing said space discharge rectifying means for equalizing the rectified currents flowing in said parallel paths, respectively.

3. In combination, two electronic devices each having an anode, a cathode and a control electrode, a current path connecting the anode and cathode of a first of said electronic devices comprising in series a source of alternating voltage, a load impedance and a primary winding of a first transformer, a current path connecting the anode and cathode of the second of said electronic devices comprising in series a source of alternating voltage, said load impedance and the primary winding of a second transformer, each of said transformers having a secondary winding, two rectifiers, two resistors connected to the output terminals of said rectifiers, respectively, means comprising said transformers for supplying the alternating components of the currents in said paths to said rectifiers, respectively, for causing corresponding unidirectional voltage to be set up across said resistors, respectively, a circuit connecting the control electrode and cathode of one of said devices including at least a portion of one of said resistors and a circuit connecting the control electrode and cathode of the other of said devices including at least a portion of the other of said resistors.

4. A regulated rectifier for rectifying current from an alternating current supply source and for supplying rectified current to a load while maintaining the load voltage substantially constant comprising a plurality of electronic rectifying devices each having an anode, a cathode and a control electrode, a plurality of current paths connecting the anode and cathode of said devices, respectively, means for supplying current from said supply source to each of said paths to cause to flow therein a rectified current having direct and alternating components, a plurality of auxiliary rectifying means for setting up unidirectional voltages the amplitudes of which vary in accordance with the amplitudes of the alternating currents supplied thereto, respectively, means for supplying said alternating current components from said paths to said auxiliary rectifying means, respectively, and means for regulating the currents in said paths for minimizing load voltage variations while maintaining the ratio of the currents in said paths substantially fixed, said means comprising means for impressing upon one of said control electrodes with respect to its cathode a voltage which varies in response to variations of one of said unidirectional voltages and variations of load voltage, and means for impressing upon the other of said control electrodes with respect to its cathode a voltage which varies in response to variations of the other of said unidirectional voltages and variations of load voltage.

5. In combination, an electronic device having an anode, a cathode and a control electrode, a current path connecting said anode and said cathode, a source of alternating voltage in said current path to cause to flow therein a current having direct and alternating components, a transformer having a primary winding connected in said current path and a secondary winding, a circuit including current rectifying means and resistance means, means comprising said transformer for supplying said alternating current components to said circuit for producing a unidirectional voltage across said resistance means and a circuit connecting said cathode and said control electrode which includes at least a portion of said resistance means for controlling the bias of said control electrode with respect to said cathode.

6. A combination in accordance with claim 5 in which said electronic device is of the gas-filled, arc discharge type.

7. A combination in accordance with claim 3 in which there is included in each of the circuits connecting the control electrode and cathode of said devices, respectively, a source of voltage which varies in accordance with the load voltage across said load impedance for maintaining said load voltage substantially constant.

8. A combination in accordance with claim 3 in which said sources of alternating voltage are derived from the same current supply source and have such a phase relationship that the alternating component of the current flowing through the primary winding of one of said transformers is out of phase with respect to the alternating component of the current flowing through the primary winding of the other of said transformers and in which is provided an autotransformer having a winding a portion of which is connected in one of said anode-cathode circuits and another portion of which is connected in the other of said anode-cathode circuits.

9. In combination, two electronic devices each having an anode, a cathode and a control electrode, a load impedance, a first transformer having a winding a mid-terminal of which is connected to one terminal of said load impedance, the other terminal of said load impedance being connected to said cathodes, a second transformer and a third transformer each having a primary winding and a secondary winding, a current path connecting the anode and cathode of a first of said electronic devices comprising in series said load, a portion of the winding of said first transformer and the primary winding of said second transformer, a current path connecting the anode and cathode of a second of said electronic devices comprising in series said load, another portion of the winding of said first transformer and the primary winding of said third transformer, means for impressing upon said current paths, respectively, alternating voltages which are out of phase with respect to each other and which are derived from an alternating current supply source to cause to flow in said paths, respectively, currents having direct and alternating components, a first circuit connecting the control grid and cathode of said first electronic device, means connected to the secondary winding of said second transformer for producing in said first circuit a unidirectional voltage in response to the alternating component of the current flowing in the primary winding of said second transformer, a second circuit connecting the control grid and cathode of said second electronic device, and means connected to the secondary winding of said third transformer for producing in said second circuit a unidirectional voltage in response to the alternating component of the current flowing in the primary winding of said third transformer.

10. In combination, two electronic devices each having an anode, a cathode and a control electrode, a load impedance, a first transformer having a winding, a mid-terminal of which is connected to one terminal of said load impedance, the other terminal of said load impedance being connected to said cathodes, a second transformer and a third transformer each having a primary winding and a secondary winding, a current path connecting the anode and cathode of a first of said electronic devices comprising in series said load, a portion of the winding of said first transformer and a primary winding of said second transformer, a current path connecting the anode and cathode of a second of said electronic devices comprising in series said load, another portion of the winding of said first transformer and the primary winding of said third transformer, means for impressing upon said current paths, respectively, alternating voltages which are out of phase with respect to each other and which are derived from an alternating current supply source to cause to flow in said paths, respectively, currents having direct and alternating components, a first circuit connecting the control grid and cathode of said first electronic device, means connected to the secondary winding of said second transformer for producing in said first circuit a unidirectional voltage in response to the alternating component of the current flowing in the primary winding of said second transformer, a second circuit connecting the control grid and cathode of said second electronic device, means connected to the secondary winding of said third transformer for producing in said second circuit a unidirectional voltage in response to the alternating component of the current flowing in the primary winding of said third transformer, the ratio of said unidirectional voltages being changed in response to changes of the relative amplitudes of the currents in said current paths for substantially equalizing the currents in said paths, and means for biasing said control electrodes with respect to said cathodes for maintaining said load voltage substantially constant.

11. A combination in accordance with claim 10 in which said electronic devices are of the gas-filled arc discharge type.

12. A combination in accordance with claim 10 in which said biasing means comprises means for deriving a unidirectional voltage having variations corresponding to load voltage variations and a unidirectional voltage having variations corresponding to line voltage variations.

13. A regulated rectifier for supplying rectified current at substantially constant voltage to a load when energy is supplied to the rectifier from a three-phase current supply source comprising two three-phase rectifiers each comprising three gas-filled electronic devices, each of said devices having an anode, a cathode and a control electrode, means for connecting said cathodes to one load terminal, three transformers each having a primary winding and two secondary windings, said primary windings being connected to different phases, respectively, of said three-phase supply source, said secondary windings being arranged in two star-connected groups each group comprising a winding of each of said transformers, terminals of different windings, respectively, of one of said star-connected groups being connected to the anodes of different electronic devices, respectively, of one of said three-phase rectifiers and terminals of different windings, respectively, of the second of said star-connected groups being connected to the anodes of different electronic devices, respectively, of the second of said three-phase rectifiers, two auxiliary transformers each having a primary and a secondary winding, an interphase transformer, means for connecting a mid-point of the winding of said interphase transformer to the second load terminal, a first circuit connecting the common terminal of the first group of said star-connected windings and said cathodes for supplying rectified current to the load comprising the primary winding of a first of said auxiliary transformers and one portion of the winding of said interphase transformer, a second circuit connecting the common terminal of the second group of said star-connected windings and said cathodes for supplying rectified current to the load comprising the primary winding of the second of said auxiliary transformers and a second portion of the winding of said interphase transformer, the currents in said circuits, respectively, each having direct and alternating components, means connected to the secondary winding of the first of said auxiliary transformers for setting up a first unidirectional biasing voltage corresponding to the alternating current component flowing in the primary transformer winding, means connected to the secondary winding of the second of said auxiliary transformers for setting up a second unidirectional biasing voltage corresponding to the alternating current component flowing in the primary transformer winding, means for setting up a third biasing voltage having variations corresponding to load voltage variations, means for setting up a fourth biasing voltage having variations corresponding to supply voltage variations, a circuit connecting the control grids of the electronic devices of said first three-phase rectifier with said cathodes comprising said first, third and fourth sources of biasing voltage and a circuit connecting the control electrodes of the electronic devices of said second three-phase rectifier with said cathodes comprising said second, third and fourth sources of biasing voltage, thereby equalizing the currents supplied by said three-phase rectifiers to said load, respectively, and maintaining said load voltage substantially constant irrespective of load variations and line voltage variations.

14. A regulated rectifier for supplying rectified current at substantially constant voltage to a load when energy is supplied to the rectifier from a three-phase current supply source comprising two three-phase rectifiers each comprising three gas-filled electronic devices, each device having an anode, a cathode and a control electrode, two transformers each having a primary and a secondary winding, an interphase transformer, a first circuit through which rectified current from a first of said three-phase rectifiers is supplied to the load comprising in series the primary winding of a first of said two transformers and a portion of the winding of said interphase transformer, a second circuit through which rectified current from the second of said three-phase rectifiers is supplied to the load comprising in series the primary winding of the second of said two transformers and another portion of the winding of said interphase transformer, means for impressing three-phase voltages upon each of said circuits for causing to flow therein rectified currents having direct and alternating components, the three-phase voltages impressed upon one of said circuits being phase displaced with respect to the three-phase voltages impressed upon the other of said circuits, means connected to the secondary windings of said transformers, respectively, for deriving unidirectional biasing voltages which vary in accordance with the amplitudes of the alternating components of the currents flowing through the corresponding primary windings, a third circuit including one of said unidirectional biasing voltages connecting the control electrodes and cathodes of the electronic devices of one of said three-phase rectifiers, a fourth circuit including the other of said unidirectional biasing voltages connecting the control electrodes and cathodes of the electronic devices of the other of said three-phase rectifiers, whereby the rectified currents supplied to the load by said two three-phase rectifiers are substantially equalized, said third and fourth circuits having a common portion, and means in said common portion for biasing the control electrodes of the electronic devices of both said three-phase rectifiers with respect to said cathodes for maintaining the load voltage substantially constant.

GEORGE W. MESZAROS.
DAVID E. TRUCKSESS.

REFERENCES CITED

The following references are of record in the file of this patent:

UNITED STATES PATENTS

| Number | Name | Date |
|---|---|---|
| 2,038,505 | Winograd | Apr. 21, 1936 |
| 2,335,673 | Herskind | Nov. 30, 1943 |

FOREIGN PATENTS

| Number | Country | Date |
|---|---|---|
| 498,739 | Great Britain | Jan. 9, 1939 |